(12) United States Patent
Larsen et al.

(10) Patent No.: US 9,587,987 B2
(45) Date of Patent: Mar. 7, 2017

(54) METHOD AND DEVICE FOR DETECTION OF MULTIPLE FLAME TYPES

(75) Inventors: Christopher Scott Larsen, Rockford, MN (US); Barrett E. Cole, Bloomington, MN (US)

(73) Assignee: Honeywell International Inc., Morris Plains, NJ (US)

( * ) Notice: Subject to any disclaimer, the term of this patent is extended or adjusted under 35 U.S.C. 154(b) by 869 days.

(21) Appl. No.: 13/417,644

(22) Filed: Mar. 12, 2012

(65) Prior Publication Data

US 2013/0234028 A1 Sep. 12, 2013

(51) Int. Cl.
*G01J 5/08* (2006.01)
*G01J 5/60* (2006.01)
*F23N 5/08* (2006.01)

(52) U.S. Cl.
CPC .............. *G01J 5/602* (2013.01); *F23N 5/082* (2013.01)

(58) Field of Classification Search
CPC .......... G01J 5/08; G01J 5/0014; G01J 5/0018; F23N 5/082
USPC .................................................... 250/339.15
See application file for complete search history.

(56) References Cited

U.S. PATENT DOCUMENTS

| | | | |
|---|---|---|---|
| 4,206,454 A * | 6/1980 | Schapira et al. | 340/578 |
| 4,459,484 A * | 7/1984 | Tar | 250/338.3 |
| 5,422,484 A * | 6/1995 | Brogi et al. | 250/339.15 |
| 5,557,262 A | 9/1996 | Tice | |
| 5,691,703 A | 11/1997 | Roby et al. | |
| 5,726,633 A | 3/1998 | Wiemeyer | |
| 6,057,549 A | 5/2000 | Castleman | |
| 6,064,064 A | 5/2000 | Castleman | |
| 6,515,283 B1 | 2/2003 | Castleman et al. | |
| 6,518,574 B1 | 2/2003 | Castleman | |
| 2003/0102434 A1* | 6/2003 | Nakauchi et al. | 250/339.15 |

FOREIGN PATENT DOCUMENTS

| | | |
|---|---|---|
| EP | 1174836 A2 | 1/2002 |
| GB | 2020417 A | 11/1979 |
| GB | 2335489 A | 9/1999 |
| WO | WO-2010151386 A1 | 12/2010 |
| WO | WO-2011071011 A1 | 6/2011 |

OTHER PUBLICATIONS

"European Application Serial No. 13157513.6, Examination Notification Art. 94(3) mailed Aug. 2, 2013", 5 pgs.
"European Application Serial No. 12794105.2, Response filed Feb. 6, 2014 to Examination Notification Art. 94(3) mailed Aug. 2, 2013", 3 pgs.

* cited by examiner

*Primary Examiner* — David Porta
*Assistant Examiner* — Faye Boosalis
(74) *Attorney, Agent, or Firm* — Schwegman Lundberg & Woessner, P.A.

(57) ABSTRACT

A flame detector includes an infrared detector and a first window covering the infrared detector. A second window is positioned in front of the first window. The flame detector is adapted to reject light having a wavelength below approximately 2 µm and to reject light having a wavelength above approximately 6 µm, allowing detection of flame from multiple sources. In variations, the windows in combination with the infrared detector may provide the rejection or a band pass filter provides the rejection. Still further variations utilize notch filters or a band reject filter to provide notches of light to the infrared detector corresponding to the wavelength of different flame sources to be detected.

13 Claims, 4 Drawing Sheets

METHOD AND DEVICE FOR DETECTION OF MULTIPLE FLAME TYPES

BACKGROUND

Traditional flame detectors use bandpass filters, allowing detection of flames in one infrared optical band by an IR detector. Generally, these filters are built to pass 4.4 μm light corresponding to hydrocarbon based flames, or to pass 2.7 μm light corresponding to hydrogen based flames. A detector will not detect a flame outside the bandwidth that it is designed to pass. Thus, a detector built for a hydrocarbon based flame will not detect a hydrogen based flame.

SUMMARY

A flame detector includes an infrared detector and a first window covering the infrared detector. A second window is positioned in front of the first window. The flame detector is adapted to reject light having a wavelength below approximately 2 μm and to reject light having a wavelength above approximately 6 μm, allowing detection of flame from multiple sources. In variations, the windows in combination with the infrared detector may provide the rejection or a band pass filter provides the rejection. Still further variations utilize notch filters or a band reject filter to provide notches of light to the infrared detector corresponding to the wavelength of different flame sources to be detected.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
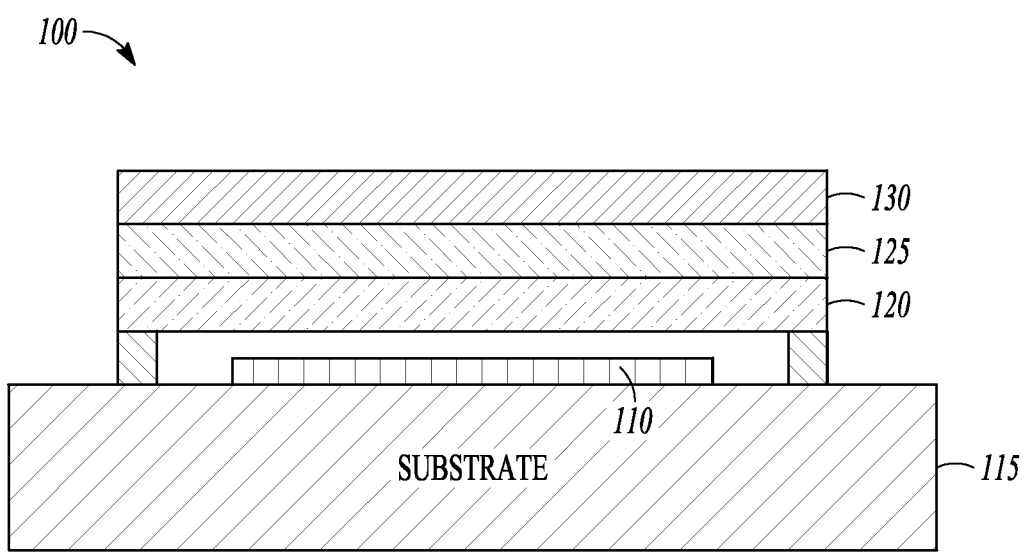
FIG. 1 is a block diagram of a multiple band flame detector according to an example embodiment.

A block diagram of a flame detector is illustrated at 100 in FIG. 1. An array of infrared detectors 110 is disposed on a substrate 115. The array is sealed by a first window 120 disposed over the array. The first window 120 is adapted to reject light having a wavelength below approximately 2 μm. The first window may be formed of Ge in one embodiment, and may further reject light having a wavelength below approximately 2.6 μm.

A second window 125 is positioned in front of the first window 120 such that the first and second windows provide a path for light from a flame to impinge on the infrared detectors 110. The second window is adapted to reject light having a wavelength above approximately 6 μm in one embodiment, and above approximately 4.5 μm in a further embodiment. In some embodiments, the second window 125 is formed of sapphire, such as explosion proof sapphire. The second window may be a 12 mm thick $Al_2O_3$ window in some embodiments.

In a further embodiment, a filter such as a band reject structure 130 is positioned on one of the first and second windows to reject a portion of light having a wavelength greater than 2.7 μm and less than 4.4 μm. Hot objects can have a significant emission in the 3-5 μm band that can equal the intensity of narrower line emissions from actual flames. The notch filters operate to reject light from hot objects that is not indicative of a flame, yet can cause false readings in prior flame detectors.

Figure 2:
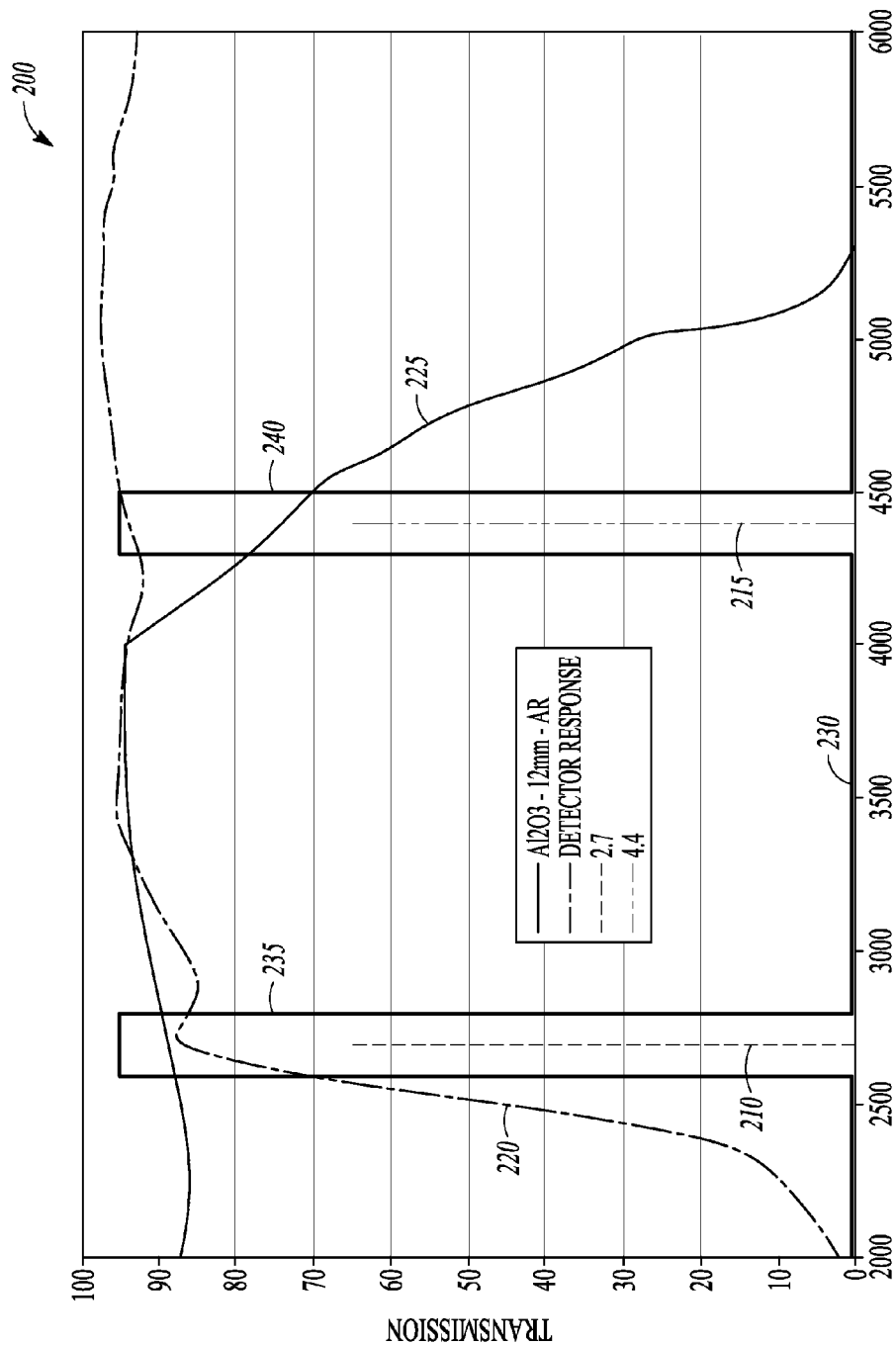
FIG. 2 is a graph illustrating filter profiles for normal incident radiation according to an example embodiment.

The band reject structure 130 in combination with the rejection of light provided by the first and second windows 120, 125 provide notch filters about 2.7 μm and 4.4 μm as illustrated in a transmission versus wavelength graph 200 in FIG. 2. The wavelength corresponding to 2.7 μm is shown by line 210, and 4.4 μm is shown by line 215. The transmission response provided by the first window 120 and detector response is indicated at 220 and the response provided by the second window is indicated at 225. The band reject structure provides a reject notch indicated at 230 between approximately 2.8 to 4.3 μm. The reject notch 230, in combination with the response of the first window at 120 and the detector at 220, provide a first transmission notch 235 and second transmission notch 240 corresponding to the hydrogen based flame emission of 2.7 μm and hydrocarbon based flame emission of 4.4 μm.

In one embodiment, the band rejection structure may be a mirror designed to reflect light in the rejection band. The mirror may be supported by an outer surface of the second window 125. In one embodiment, the rejection band is between approximately 2.8 μm and 4.3 μm.

In a further embodiment, the first window 120 rejects light having a wavelength below approximately 2.6 μm and the second window 125 rejects light having a wavelength above 4.5 μm.

In a further embodiment, the band rejection structure may be a dual notch filter designed to pass light about 2.7 μm and 4.4 μm. The dual notch filter may be formed with multiple layers. One example of a multiple layer band rejection structure includes the following layers with corresponding depths in μms:

| | |
|---|---|
| SI | 188.34 |
| ZRO2SIO2 | 318.47 |
| SI | 196.88 |

-continued

| | |
|---|---|
| ZRO2SIO2 | 318.52 |
| SI | 198.82 |
| ZRO2SIO2 | 318.51 |
| SI | 194.97 |
| ZRO2SIO2 | 318.44 |
| SI | 177.22 |
| ZRO2SIO2 | 636.58 |
| SI | 176.65 |
| ZRO2SIO2 | 318.44 |
| SI | 195.38 |
| ZRO2SIO2 | 318.53 |
| SI | 202.01 |
| ZRO2SIO2 | 318.55 |
| SI | 198.82 |
| ZRO2SIO2 | 318.48 |
| SI | 188.22 |
| SI | 303.77 |
| ZRO2SIO2 | 519.07 |
| SI | 313.35 |
| ZRO2SIO2 | 519.11 |
| SI | 315.08 |
| ZRO2SIO2 | 519.09 |
| SI | 306.69 |
| ZRO2SIO2 | 519.03 |
| SI | 303.40 |
| ZRO2SIO2 | 1038.03 |
| SI | 297.01 |
| ZRO2SIO2 | 518.91 |
| SI | 283.09 |
| ZRO2SIO2 | 518.82 |
| SI | 278.31 |
| ZRO2SIO2 | 518.84 |
| SI | 284.26 |
| ZRO2SIO2 | 518.91 |
| SI | 294.15 |

This multi-layer dual notch filter may be represented by an approximate formula:

(HL)^5(LH)^5(BA)^5(AB)^5/Al2O3 where

H=Si A=1.63H
L=Sencoe ZrO2 B=1.63L

The filter has the following approximate characteristics:
Transmits 2700 nm and 4400 nm and blocks below 2500 nm and above 6000 nm Reducing layers widens peaks
Optimized for 2 peaks and minimized at 3400-3600 nm
Not much pyro detector response below 2.3 µm
No sapphire transmission above ~5.0 µm This is just one example, and the depths of the layers, number of layers, and content of the layers may be varied in further embodiments.

Figure 3:
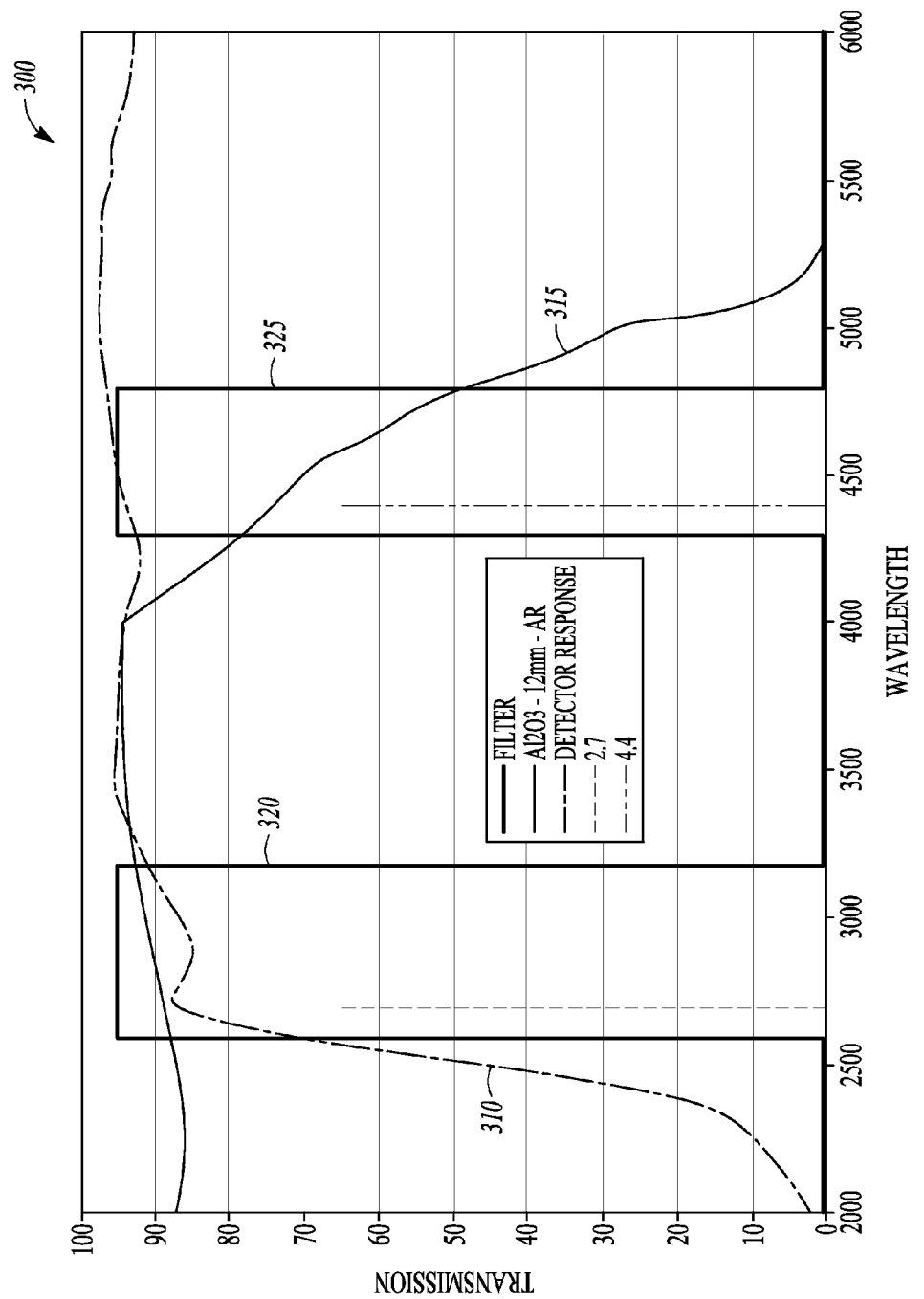
FIG. 3 is a graph illustrating filter profiles for a wide field of view multiple band flame detector according to an example embodiment.

In a further embodiment illustrated in a graph 300 in FIG. 3, the band reject structure 130 rejects a portion of light having a wavelength greater than a value from 2.8 to 3.2 µm and less than 4.3 µm. The band rejection structure 130 is used in conjunction with the first window 120 that is adapted to reject light having a wavelength below approximately 2.6 µm as illustrated by response 310 corresponding to the first window and detector, and the second window 125 that is adapted to reject light having a wavelength having a value of greater than 4.5 to 4.8 µm as indicated by response 315. In the resulting structure, bands of light about 2.7 µm at 320 and 4.4 µm at 325 are detected. These bands are deliberately shifted toward longer wavelengths to accommodate wavelength shifting of light by system optics from flames at angles different than orthogonal to the detector windows. As light strikes the second window at an angle from normal, the wavelength of the light is slightly decreased. By first shifting the notch filters toward longer wavelengths, the shift toward shorter wavelengths caused by the system optics is accommodated, and the field of view of the detector 100 is increased. Note that the lower boundaries of the bands are not shifted, as they still are selected to detect flames emitting radiation orthogonal to the windows and detectors.

Figure 4:
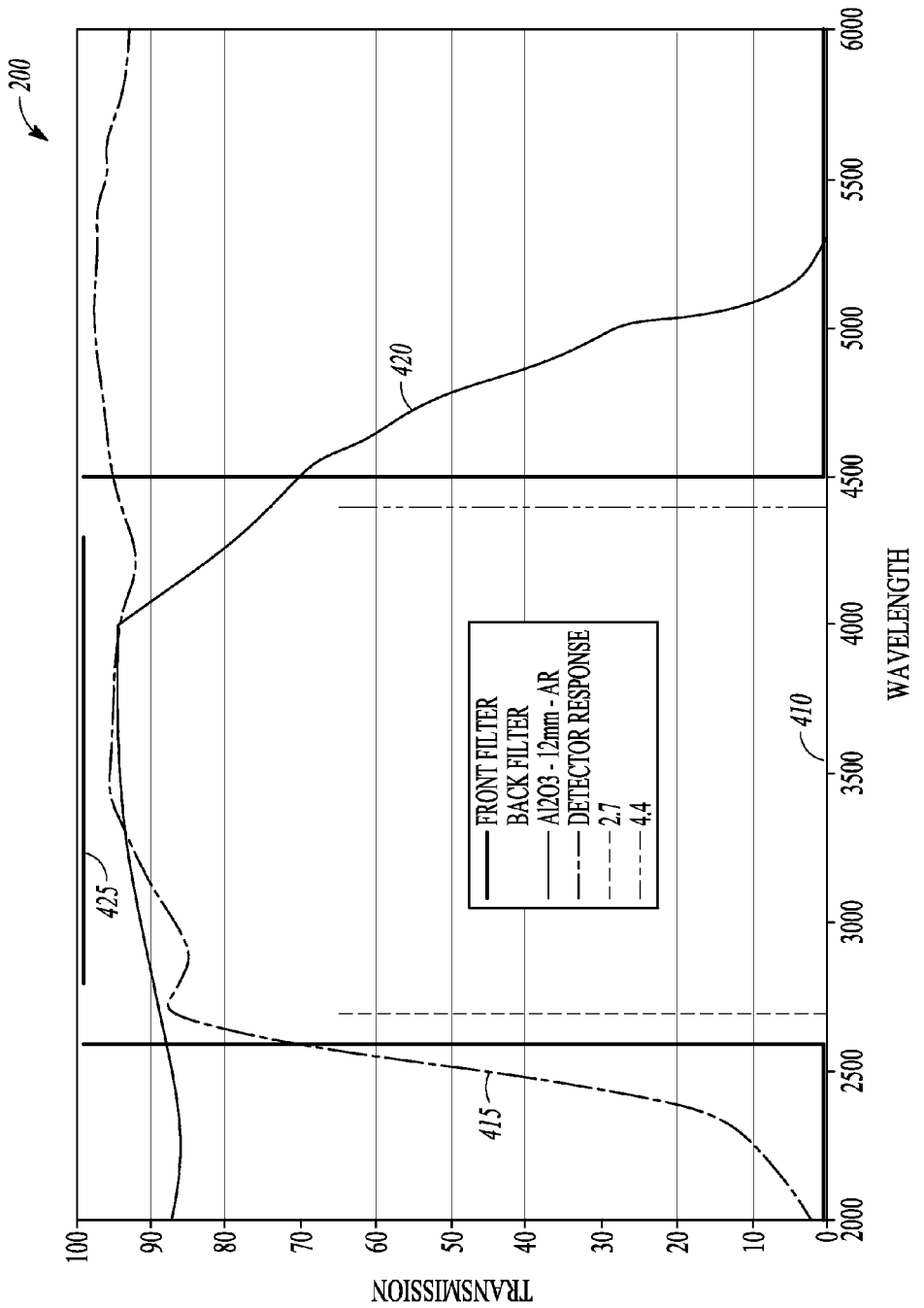
FIG. 4 is a graph illustrating the use of a rejection filter in a multiple band flame detector according to an example embodiment.

FIG. 4 is a graph 400 that illustrates mid band rejection when the band reject structure 130 is a mirror, or a reflection filter. The response of the filter is indicated at 410, with the response of the first window and detector indicated at 415 and that of the second window indicated at 420. In one embodiment, a wide band transmission filter 425 is used as part of the band rejection structure 130. The combination of the mirror and wide band transmission filter 425 provides similar notches to pass the desired frequencies. In one embodiment, the notches may be shifted toward longer wavelengths to provide a wider field of view.

In one embodiment, the mirror or rejection filter may be formed with multiple layers arranged as follows:

| | |
|---|---|
| ZRO2 | 307.22 |
| SIO2 | 991.51 |
| ZRO2 | 307.43 |
| SIO2 | 0.00 |
| ZRO2 | 797.69 |
| SIO2 | 712.82 |
| ZRO2 | 413.83 |
| SIO2 | 613.02 |
| ZRO2 | 413.19 |
| SIO2 | 605.66 |
| ZRO2 | 403.90 |
| SIO2 | 638.60 |
| ZRO2 | 400.74 |
| SIO2 | 677.17 |
| ZRO2 | 461.27 |
| SIO2 | 165.51 |
| ZRO2 | 575.39 |

This is just one example, and the depths of the layers, number of layers, and content of the layers may be varied in further embodiments.

The various embodiments of the flame detector may provide the ability to detect flame from multiple different sources, while reducing the amount of false positives resulting from hot bodies that are not on flame. The detector may operate over a wide field of view in various embodiments by shifting edges of the notch filters toward longer wavelengths to account for corresponding wavelength shifts caused by radiation entering the detector from an angle. Angles of 30 degrees or more may be accommodated by such shifts.

The word, approximately, has been used with respect to various wavelengths. When used to describe wavelengths for the various structures that pass or reflect light, the actual values used may vary about the stated value in a manner that still permits detection of flame at the various wavelengths described. For instance, the shifts of notch filters toward longer wavelengths may vary by several tenths of micrometers, yet still provide for adequate detection of flames at the desired wavelengths. The amount of discrimination of hot bodies may be ignored in some instances, or taken into consideration in others depending on design needs.

EXAMPLES

1. A flame detector comprising:
an infrared detector;
a detector system response able to reject light having a wavelength below approximately 2 µm; and
a second window positioned in front of the detector system, wherein the second window is adapted to reject light having a wavelength above approximately 6 µm.

2. The flame detector of example 1 and further comprising a first window formed of germanium to reject light having a wavelength below approximately 2 µm.

3. The flame detector of any one of examples 1-2 wherein the second window is formed of sapphire.

4. The flame detector of any one of examples 1-3 wherein the infrared detector is an infrared detector array.

5. The flame detector of any one of examples 1-4 and further comprising a band reject structure to reject a portion of light having a wavelength greater than 2.7 µm and less than 4.4 µm.

6. The flame detector of example 5 and further comprising a first window formed of germanium wherein the band reject structure is supported by the second window or the first window.

7. The flame detector of any one of examples 5-6 wherein the first window rejects light having a wavelength below approximately 2.6 µm and wherein the second window rejects light having a wavelength above 4.5 µm.

8. The flame detector of any one of examples 5-7 and further comprising a band pass filter to pass light having a wavelength greater than approximately 2.6 µm and less than approximately 4.5 µm.

9. The flame detector of any one of examples 1-8 and further comprising a band reject structure to reject a portion of light having a wavelength greater than 2.8 µm and less than 4.3 µm wherein the first window rejects light having a wavelength below approximately 2600 µm and wherein the second window rejects light having a wavelength above 4600 µm such that bands of light about 2.7 µm and 4.4 µm are passed to the detector after accommodating for a shift to shorter wavelengths caused by a field of view of the flame detector.

10. The flame detector of example 9 wherein the flame detector provides a field of view to accommodate shifting of light from flames at angles different than orthogonal to the detector windows.

11. A flame detector comprising:
an infrared detector;
a first window covering the infrared detector;
a second window positioned in front of the first window; and
a band transmission filter positioned to block light having a wavelength less than approximately 2.5 µm and block light having a wavelength greater than approximately 4.5 µm from reaching the infrared detector.

12. The flame detector of example 11 and further comprising a band reject structure to reject a portion of light having a wavelength greater than 2.8 µm and less than 4.3 µm.

13. The flame detector of example 12 wherein bands of light about 2.7 µm and 4.4 µm are passed to the detector, wherein the bands have already been shifted to shorter wavelengths by optical elements in the flame detector.

14. The flame detector of example 13 wherein the flame detector provides a field of view to accommodate wavelength shifting of light from flames at angles different than orthogonal to the detector windows.

15. The flame detector of any one of examples 11-14 wherein the first window is formed of germanium.

16. The flame detector of any one of examples 11-15 wherein the second window is formed of sapphire.

17. A method comprising:
receiving light from a potential source of flame;
rejecting light having a wavelength below approximately 2 µm;
rejecting light having a wavelength above approximately 6 µm; and
providing the light not rejected to an infrared detector element.

18. The method of example 17 wherein the light is rejected by a bandpass filter.

19. The method of any one of examples 17-18 and further comprising rejecting light between approximately 2.8 µm and 4.3 µm.

20. The method of any one of examples 11-19 wherein the light is rejected by a first window covering the infrared detector element and a second window positioned over the first window.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A flame detector comprising:
an infrared detector;
a first window formed of germanium positioned adjacent the infrared detector, wherein the first window rejects light having a wavelength below approximately 2.6 µm;
a second window positioned adjacent to the first window, wherein the second window rejects light having a wavelength above approximately 4.5 µm; and
a band reject structure positioned adjacent to the second window, wherein the band reject structure rejects a portion of light having a wavelength greater than 2.7 µm and less than 4.4 µm.

2. The flame detector of claim 1 wherein the second window is formed of sapphire.

3. The flame detector of claim 1 wherein the infrared detector is an infrared detector array.

4. The flame detector of claim 1 wherein the band reject structure is supported by the second window or the first window.

5. The flame detector of claim 1 and further comprising a band pass filter to pass light having a wavelength greater than approximately 2.6 µm and less than approximately 4.5 µm.

6. A flame detector comprising:
an infrared detector;
a first window covering the infrared detector;
a second window positioned in front of the first window;
a band transmission filter positioned to block light having a wavelength less than approximately 2.5 µm and block light having a wavelength greater than approximately 4.5 µm from reaching the infrared detector, thereby permitting transmission of light having a wavelength of between 2.5 µm and 4.5 µm; and
a band reject structure positioned to reject light having a wavelength greater than 2.8 µm and less than 4.3 µm, such that light between 2.5 µm and 2.8 µm and light between 4.3 µm and 4.5 µm is transmitted to the infrared detector.

7. The flame detector of claim 6 wherein bands of light about 2.7 µm and 4.4 µm are passed to the infrared detector, wherein the bands have already been shifted to shorter wavelengths by optical elements in the flame detector.

8. The flame detector of claim 7 wherein the flame detector provides a field of view to accommodate wavelength shifting of light from flames at angles different than orthogonal to the detector windows.

9. The flame detector of claim 6 wherein the first window is formed of germanium.

10. The flame detector of claim 6 wherein the second window is formed of sapphire.

11. A method comprising:
receiving light from a potential source of flame;
rejecting light having a wavelength below approximately 2.7 µm;
rejecting light having a wavelength above approximately 4.4 µm;
rejecting light between approximately 2.8 µm and 4.3 µm; and
providing light having a wavelength of between 2.7-2.8 µm or light having a wavelength of between 4.3-4.4 µm to an infrared detector element.

12. The method of claim 11 wherein the light is rejected by a bandpass filter.

13. The method of claim 11 wherein the light is rejected by a first window covering the infrared detector element and a second window positioned over the first window.

* * * * *